United States Patent
Nishio et al.

(10) Patent No.: US 7,254,125 B2
(45) Date of Patent: Aug. 7, 2007

(54) RECEIVING APPARATUS AND METHOD OF DETECTING TOP PATH IN DELAY PROFILE

(75) Inventors: Akihiko Nishio, Yokosuka (JP); Hideki Aoyagi, Sendai (JP); Hiroki Haga, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 641 days.

(21) Appl. No.: 10/491,573

(22) PCT Filed: May 16, 2003

(86) PCT No.: PCT/JP03/06101

§ 371 (c)(1),
(2), (4) Date: Apr. 5, 2004

(87) PCT Pub. No.: WO03/098827

PCT Pub. Date: Nov. 27, 2003

(65) Prior Publication Data
US 2004/0264415 A1    Dec. 30, 2004

(30) Foreign Application Priority Data
May 23, 2002 (JP) .............................. 2002-148267

(51) Int. Cl.
*H04B 7/216* (2006.01)
(52) U.S. Cl. .................. 370/342; 375/145; 375/149
(58) Field of Classification Search ............. 370/335, 370/342, 441; 375/145, 149, 150
See application file for complete search history.

(56) References Cited

U.S. PATENT DOCUMENTS 5,898,665 A    4/1999    Sawahashi et al.
6,775,521 B1 *    8/2004    Chen ........................ 455/67.11
2001/0043643 A1 *    11/2001    Ogami ........................ 375/147

(Continued)

FOREIGN PATENT DOCUMENTS

EP    1096694    5/2001

(Continued)

OTHER PUBLICATIONS

PCT International Search Report dated Jul. 15, 2003.

(Continued)

*Primary Examiner*—Lee Nguyen
(74) *Attorney, Agent, or Firm*—Stevens, Davis, Miller & Mosher, LLP (57) ABSTRACT

Using midambles, tracking delay profile creator 107 opens correlation windows in the range of 8 chips before and behind the top path and creates delay profiles within this range. From the delay profiles, path determiner 108 detects whether or not there is a new path before the top path, and, when there is a new path, determines whether or not this is its path. Based on the result of the determination at path determiner 108, when the new path is its path, frame position controller 109 sets the top path with the new path. On the other hand, when the new path is not its path, the top path set earlier is retained as is as the top path. Then, in accordance with the timing of the top path set, a received signal is demodulated. By this means, reception quality can be improved.

9 Claims, 11 Drawing Sheets

U.S. PATENT DOCUMENTS

2002/0181557 A1    12/2002  Fujii
2004/0259517 A1*   12/2004  Takahashi et al. .......... 455/295

FOREIGN PATENT DOCUMENTS

| JP | 2002 111542 | 4/2002 |
|----|-------------|--------|
| WO | 9621294     | 7/1996 |

OTHER PUBLICATIONS

3 GPP TS 25.221 V4.4.0(Mar. 2002), 3rd Generation Partnership Project; Technical Specification Group Radio Access Network; Physical channels and mapping of transport channels onto physical channels (TDD) (Release 4), Mar. 2002, pp. 1-90.

3GPP TS 25.224 V4.4.0(Mar. 2002), 3rd Generation Partnership Project; Technical Specification Group Radio Access Network; Physical Layer Procedures (TDD) (Release 4), Mar. 2002, pp. 1-40.

Supplementary European Search Report dated Apr. 20, 2007.

* cited by examiner

FIG.11 ically as a pilot sequence,
RECEIVING APPARATUS AND METHOD OF DETECTING TOP PATH IN DELAY PROFILE

TECHNICAL FIELD

The present invention relates to a receiving apparatus and a method of detecting the top path in a delay profile.

BACKGROUND ART

In IMT2000-TDD, a midamble, which is a pilot sequence, is inserted in the center of a time slot. Multiplexed signals from multiple users arrive at the receiving end, and the receiving end performs correlation operation using midambles different for each signal, thereby creating delay profiles on a per midamble basis, detecting paths and subjecting these to rake-demodulation or JD-demodulation, and acquiring the received data.

To acquire the received data on a per user basis, it is necessary to detect the timing of each user's top path in delay profiles. Now, there is processing referred to as frame tracking for tracking the frame timings. By virtue of this frame tracking processing, the top path in a delay profile is detected on a per user basis, and the received data is demodulated by adjusting the timing in accordance with the top path. Usually, tracking processing is performed using a common channel that all users share. On this common channel, a signal is multiplexed with a user signal. At the receiving end, following user-specific delay profiles, delay profiles of the common channel are created.

Now, when the receiving party moves while engaged in communication, and when, for instance, the receiving party moves out from behind a building while communicating, the receiving party is then able to receive direct waves from the base station apparatus after moving out from behind the building. Consequently, new peaks by the direct waves might appear before the peaks by the delay waves. If these peaks by the direct waves can be selected as paths and used for rake combining, the quality of the received signal after the rake combining can be improved. So, when paths such as above are detected, tracking processing is performed such that the top path is changed to a path by a direct wave.

On the other hand, a mobile apparatus receives multiplexed transmission data from multiple users. Consequently, when there is a new path before the top path, there is a possibility that the correlation operation result at a timing before the top path shows the component of another user signal using a midamble corresponding to a circulation amount as of just before.

That is, the communication schemes of IMT2000-TDD use midambles that are created on a per channel basis by cyclically shifting the basic midamble. Consequently, the correlation operation result at a timing before the top path and the correlation operation result of a channel using a midamble shift corresponding to a circulation amount as of just before may show the same component.

However, with a typical receiving apparatus, when there is a new path before the top path in a delay profile, by tracking processing, this new path is always set as the new top path. Consequently, when the new path happens to be another user's delayed wave or the like, the reception is done at wrong timings and this may disable communications.

DISCLOSURE OF INVENTION

The object of the present invention is to improve reception quality.

Where there is a new path before the top path in a delay profile of a specific channel, a determination is made as to whether or not this new path is a path for the specific channel, and when the new path is determined to be a path for the specific channel, the new path is added and selected; thus, the above object can be accomplished.

BEST MODE FOR CARRYING OUT THE INVENTION

Embodiments of the present invention will be described below in detail with reference to the accompanying drawings.

(First Embodiment)

Figure 1:
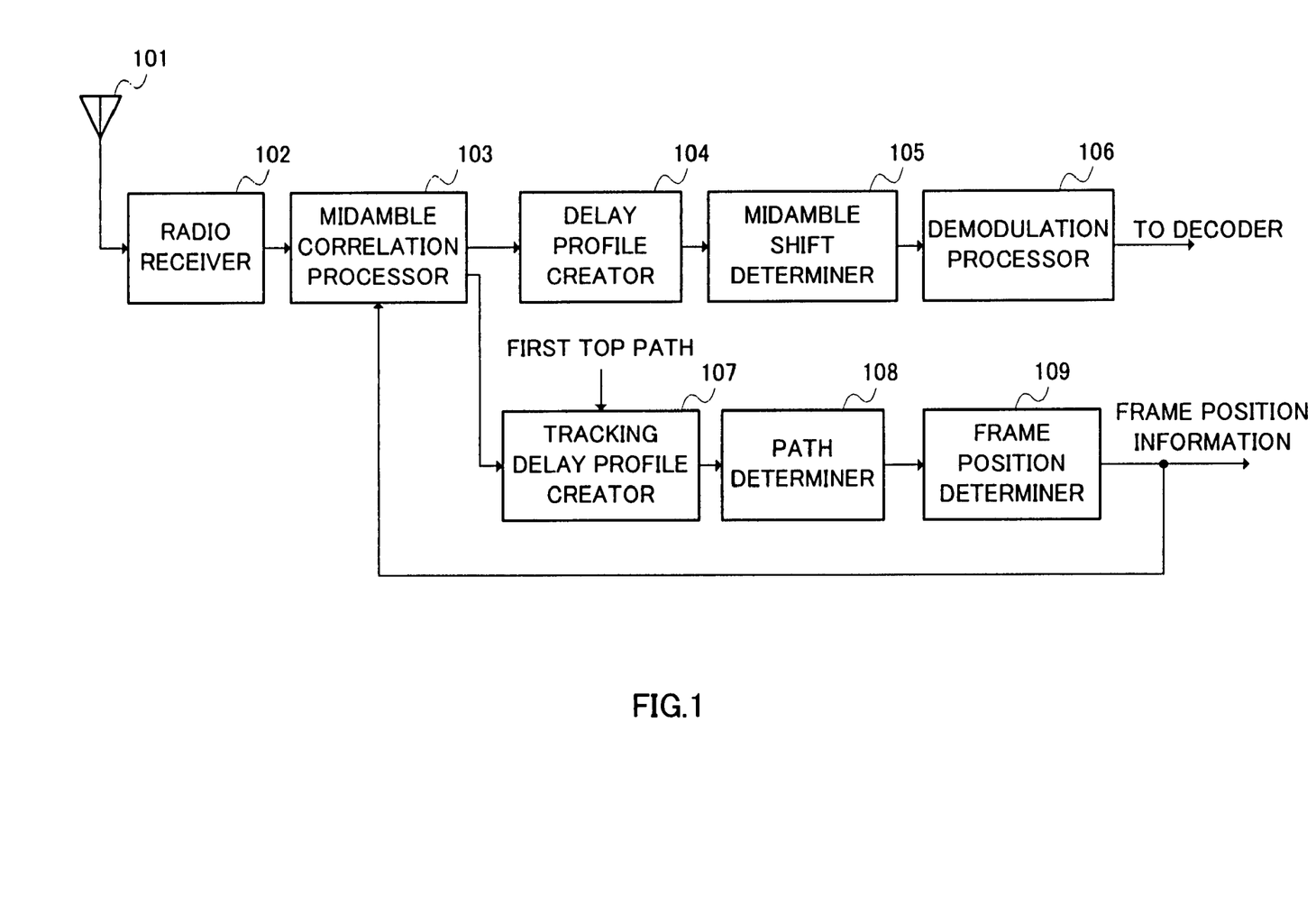
FIG. 1 is a block diagram showing a configuration of a receiving apparatus according to the first embodiment of the present invention.

FIG. 1 is a drawing showing a configuration of a receiving apparatus according to the present embodiment. The receiving apparatus according to the present embodiment consists chiefly of antenna 101, radio receiver 102, midamble correlation processor 103, delay profile creator 104, midamble shift determiner 105, demodulation processor 106, tracking delay profile creator 107, path determiner 108, and frame position controller 109.

Radio receiver 102 executes prescribed radio processing on a signal received by antenna 101 including down-conversion, and outputs the result to correlation processor 103.

Midamble correlation processor 103 is a correlation operator and performs correlation operation between the pilot signal portion, called midamble, included in the received signal input from radio receiver 102, and a known midamble sequence, and outputs the result to delay profile creator 104 and tracking delay profile creator 107.

In response to the operation result input from midamble correlation processor 103, delay profile creator 104 creates delay profiles on a per midamble shift basis, with divisions made on a per 16 chips basis, and outputs the result to midamble shift determiner 105.

Provided with the delay profiles created at delay profile creator 104, midamble shift determiner 105 determines, on a per user basis, whether there are paths above a prescribed threshold level, and, when there is a user with a path above the threshold level, determines this user is a communicating user, and outputs this determination result to demodulation processor 106.

Demodulation processor 106 performs demodulation processing based on the delay profiles input from midamble shift determiner 105 and the shift determination result, and, after the demodulation, outputs the result to a decoder, which is not shown in the drawing.

Figure 2:
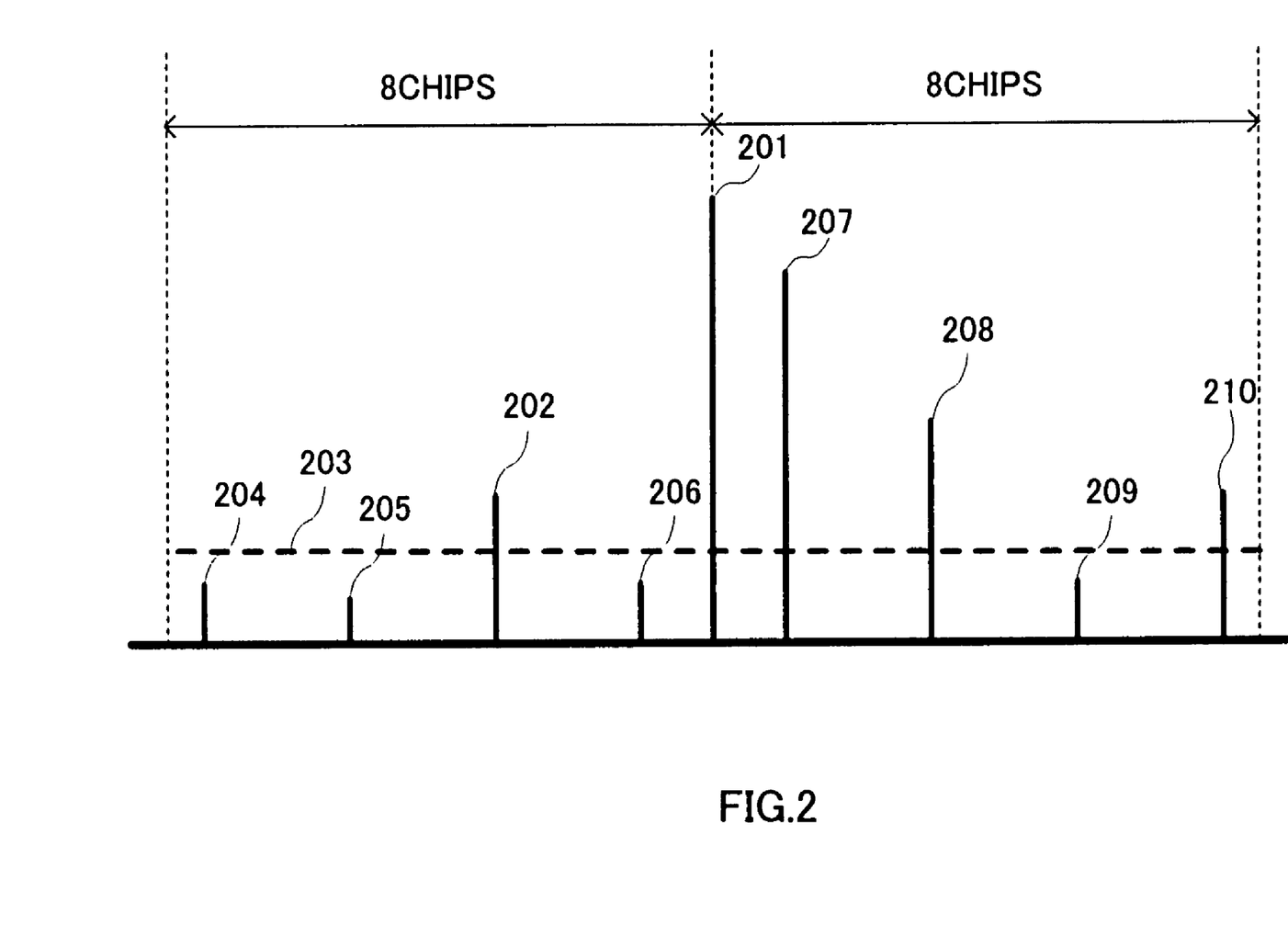
FIG. 2 is a drawing showing a delay profile according to the first embodiment of the present invention.

Based on the operation result input from midamble correlation processor 103, tracking delay profile creator 107 creates delay profiles such as shown in FIG. 2, and outputs the created delay profiles to path determiner 108. The path position of top path 201, detected upon a cell search prior to communication, is input into tracking delay profile creator 107, and correlation windows of 8 chips open before and behind initial top path 201, total 16 chips, and thus the delay profiles are created. Path determiner 108 is a determiner and determines whether or not there are new paths before top path 201, and, when there are new paths, selects these new paths. In FIG. 2, the peaks above threshold level 203 are selected as new paths 202, while peaks 204, 205, and 206, falling below threshold level 203, are not selected as paths. Then, a determination is made as to whether or not new path 202 can be selected as is as a path for common channel signals, and this determination result is output to frame position controller 109. The method of determining whether or not new path 202 is a path for common channel signals will be later described in detail.

From the determination result input from path determiner 108, when new path 202 is determined to be a path for common channel signals, frame position controller 109 sets new path 202 as the new top path. When new path 202 is determined not to be a path for common channel signals, frame position controller 109 retains top path 201 set earlier as is as the top path. The top path set thus is output to midamble correlation processor 103 as frame information, and each processing is performed at a timing based on this frame information.

Next, the reason that new path 202 is not necessarily a path for common channel signals will be explained. Midambles are created by the method illustrated in FIG. 3. Midambles 301-1~301-8 each have the length of 144 chips, and are created using two basic midamble codes 302 made up of 128 chips, within the range of these two basic midamble codes 302, by cyclical shifts on a per 16 chip basis. 8 types of midambles, 301-1~301-8, are created. Midamble code 301-1 is for use for the common channel, and the rest of the midamble codes, 301-2~301-8, are for use for other users. Consequently, the midamble codes are given despreading processing using respective spreading codes, multiplexed, and transmitted. In this case, the user using the midamble code of the circulation amount as of just before midamble code 301-1 for the common channel is the user using midamble code 301-8 (hereinafter "user 8").

Figure 3:
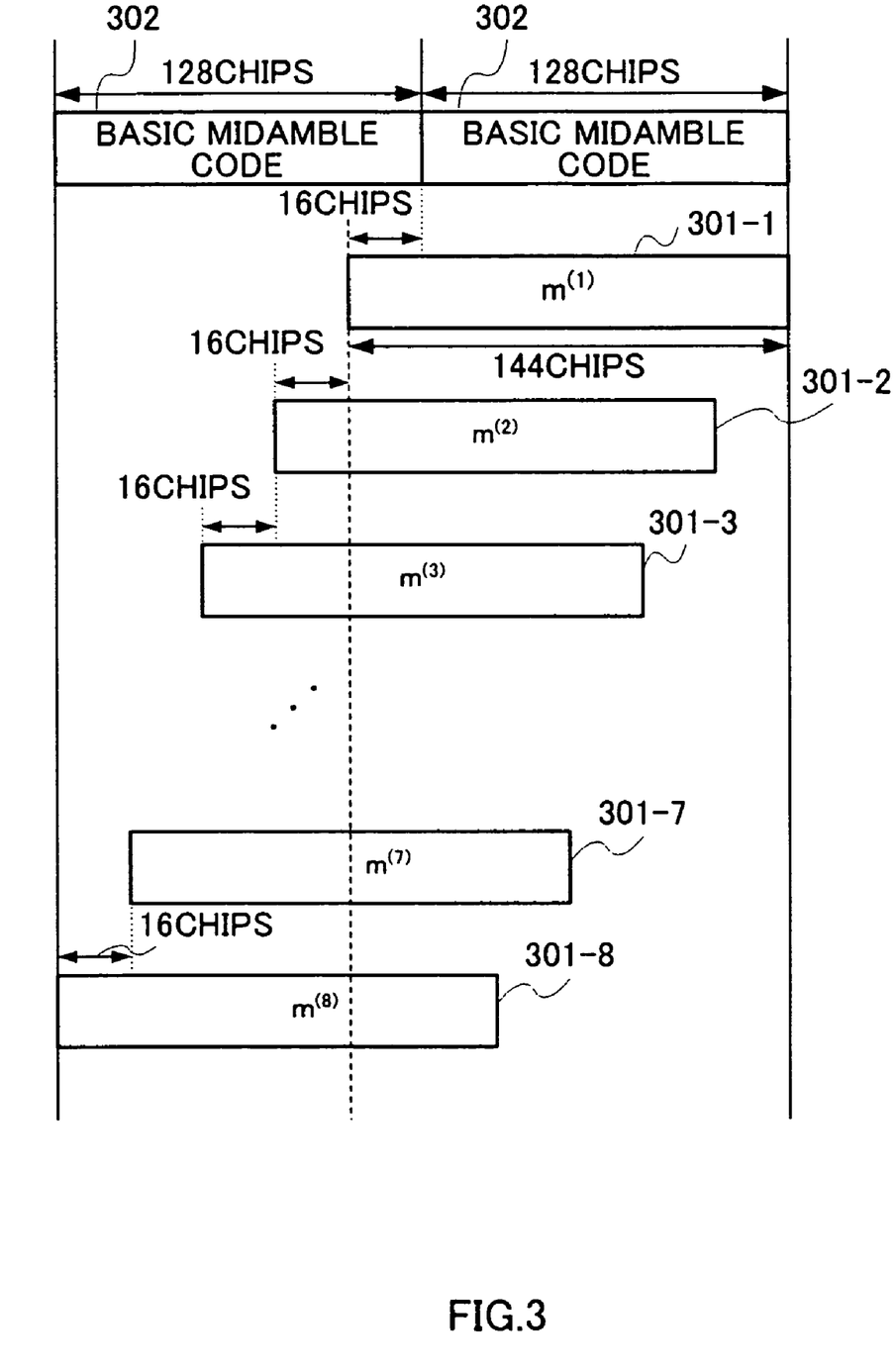
FIG. 3 is a drawing illustrating a delay profile creating method.

At the receiving end, with midambles 301-1~301-8 received, correlation operation is performed while basic midamble codes 302 are cyclically shifted on a per 16 chips basis. Based on this operation result, delay profiles are created continuously on a per user basis.

The P-CCPCH (common channel) for use in tracking processing uses midamble code 301-1, and the circulation amount between midamble code 301-1 for the common channel and midamble code 301-8 is only 16 chips. Consequently, for example, the peaks occurring where midamble code 301-1 for a user using the common channel is received four chips earlier than the top path, and the peaks occurring where midamble code 301-8 for another user using a user-specific channel is received with a delay of 12 chips have the same waveform and as a result arrive at the same position. For reasons such as above, in tracking processing, a new path may exist before the current top path, and this new path may not be a path for common channel signals but is a path for user 8.

Figure 4:
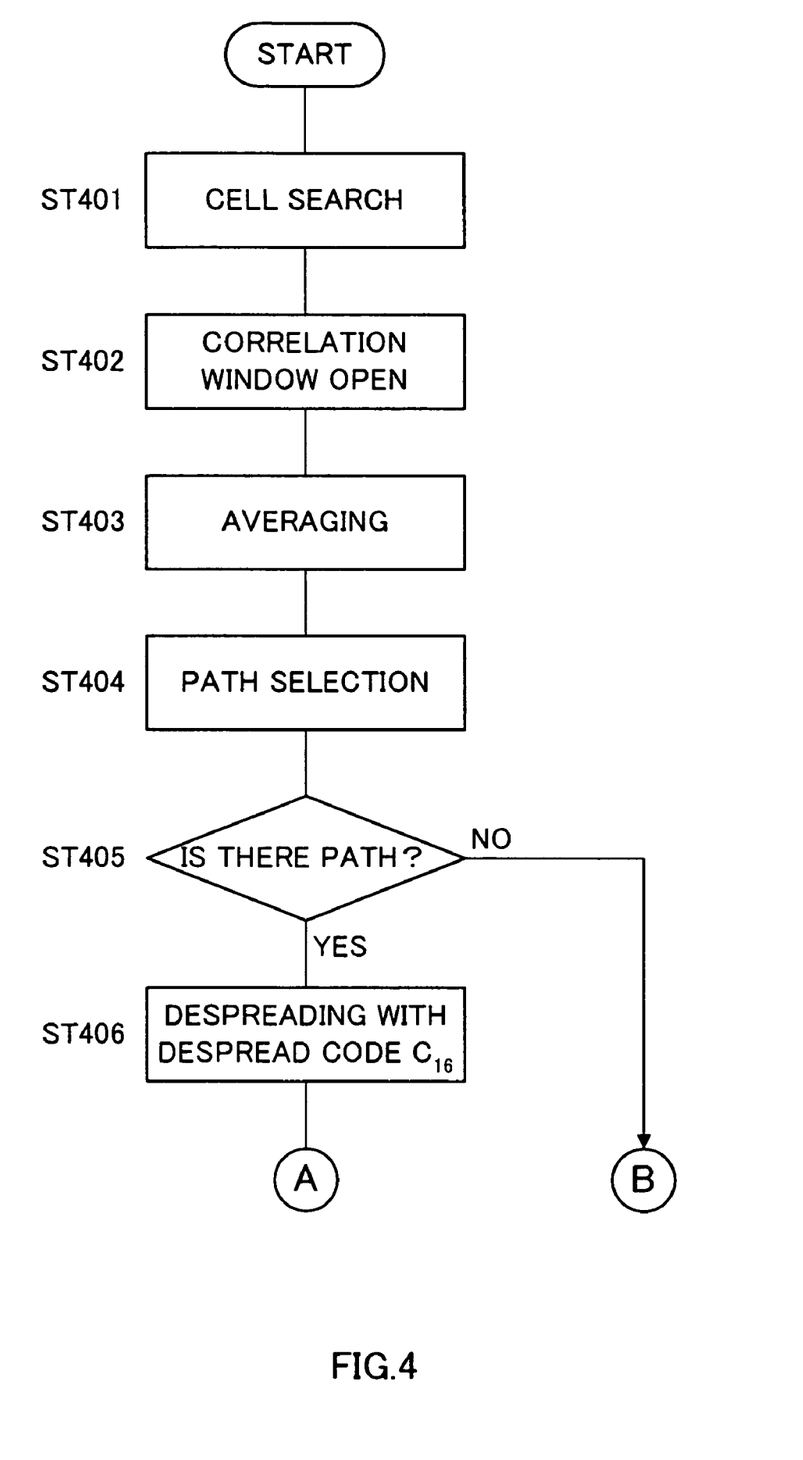
FIG. 4 is a flowchart showing the operation of a receiving apparatus according to the first embodiment of the present invention.
Figure 5:
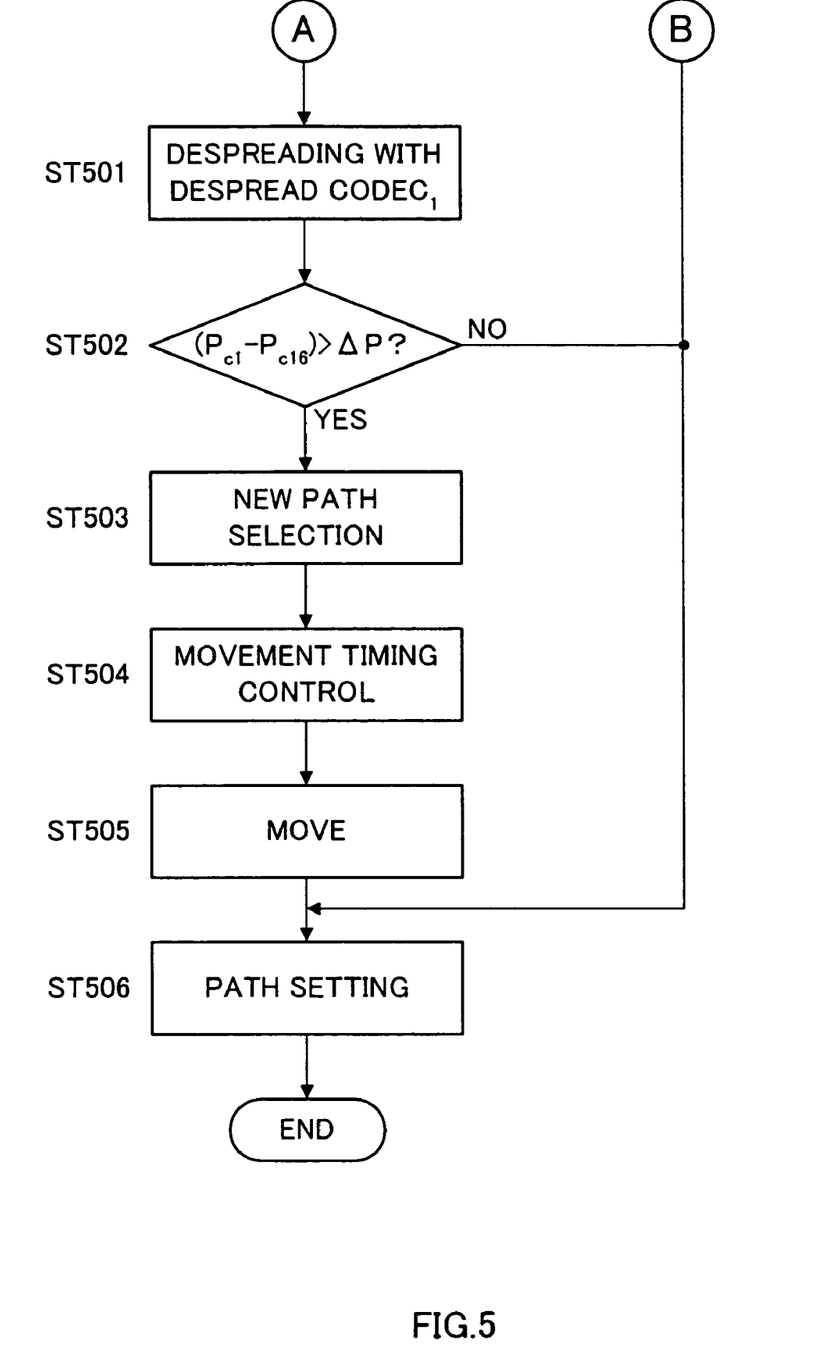
FIG. 5 is a flowchart showing the operation of a receiving apparatus according to the first embodiment of the present invention.

Next, a top path setting method and a tracking processing method will be explained with reference to FIG. 2, FIG. 4, and FIG. 5.

A case will be described here with the first embodiment where a transmission signal on the common channel using midamble code 301-1 and a transmission signal for user 8 are multiplexed and transmitted. In this case, the transmission signal on the common channel is given spreading processing using spreading code $C_1$, and the transmission signal for user 8 is given spreading processing using spreading code $C_{16}$. Whether or not transmission signals including other midamble codes than midamble code 301-1 and midamble code 301-8 are subject to multiplexing is optional.

First, a cell search is performed between a base station apparatus and a mobile apparatus, thereby detecting the first top path (Step (hereinafter "ST") 401).

Next, as shown in FIG. 2, before and behind top path 201 determined by the cell search, correlation windows of 8 chips open, and delay profiles are created (ST402). Incidentally, the 8 chips before the top path can be substituted with a delay profile of user 8.

Next, the delay profiles are time-averaged (ST403).

Next, referring to the averaged delay profile, peaks 204, 205, and 206, falling below threshold level 203, are not selected, whereas paths 201, 202, 207, 208, and 209, above threshold level 203, are selected (ST404).

Referring to paths 201, 202, 207, 208, and 209 selected thus, a determination is made as to whether there is a path before top path 201 (ST405). Referring to FIG. 2, although there is path 202 before top path 201, a delay profile of user 8 is created just before a delay profile of common channel signals, continuously, and so at this point it is not altogether clear whether path 202 is a path for common channel signals or a path for user 8.

Next, despreading processing is performed with spreading code $C_{16}$, using the data portion of the received signal (ST406). Likewise, despreading processing is performed with spreading code $C_1$, using the data portion of the received signal (ST501). When the despreading processing is preformed thus using the data portion, several symbols just before or behind a midamble of good channel estimation accuracy are used. Incidentally, it is equally possible to perform the despreading processing using other data portions than the several symbols just before or behind the midamble.

Next, a comparison is drawn between output value $P_{C16}$, which is a peak power value corresponding to the despreading by despreading code $C_{16}$, and output value Pcl, which is a peak power value corresponding to the despreading by despreading code $C_{16}$, and when output value $P_{C1}$ corresponding to the despreading by spreading code $P_{C1}$ is greater, path 202 is determined to be a path for common channel signals (ST502), and path 202 is selected as the new top path (ST503). This is because if path 202 is a path for common channel signals, the despreading result with despreading code $C_1$ for the common channel is expected to be greater than the despreading result with spreading code $C_{16}$ for user 8. Incidentally, the processings from ST403 to ST503 are performed at path determiner 108.

Next, a control is performed on path 202 as to the timing of tracking processing (ST504). The top path is moved from path 201 to path 202 through tracking processing (ST505). The top path is set (ST506).

On the other hand, in ST405, when among the paths selected there is no path before top path 201, top path 201 is retained as is as the top path (ST506).

Moreover, in ST502, when the output value of the spreading by spreading code $C_1$ is smaller than the output value of the spreading by spreading code $C_{16}$, path 202 is determined not to be a path for common channel signals, and top path 201 is retained as is as the top path (ST506).

In ST405, regarding the method of determining whether or not new path 202 is a path for common channel signals, in addition to the above-described method, it is equally possible to select new path 202 as a path for common channel signals when the output value corresponding to the despreading by despreading code $C_1$ is above a prescribed threshold level. Further, it is also possible to select new path 202 as a path for common channel signals when the output value corresponding to the despreading by spreading code $C_{16}$ is smaller than a prescribed threshold level. Moreover, it is also possible to subtract output value $P_{C16}$ corresponding to the despreading by despreading code $C_{16}$ from output value $P_{C1}$ corresponding to the despreading by spreading code $C_1$, and, when the subtraction result is greater than a prescribed value, select new path 202 as a path for common channel signals. By this means, it is possible to avoid selecting a noise component, which is neither a path on the common channel nor a path for user 8, as a path for the common channel.

Incidentally, in ST405, when several paths are selected before top path 201, the processings of ST401 to ST506 are first performed with respect to the closest path to top path 201 to provisionally set the top path, and the processings of ST401 to ST506 are performed with respect to the second closest path to top path 201 to set the top path again.

Thus, in ST405, when multiple paths are selected before top path 201, the processings of ST401 to ST506 are performed the same number of times as the number of the paths selected. Incidentally, with the current frame, only the first path is processed, and the second path may be processed in later frames.

Thus, according to the receiving apparatus of the present embodiment, when new path 202 is present before top path 201 in a delay profile, a determination is made as to whether or not this new path 202 is a path for common channel signals, and, only when new path 202 is determined to be a path for common channel signals, is the top path set with new path 202 through tracking processing. Consequently, it is possible to avoid disabling communication by setting another person's path or the like as the top path.

In addition, when a determination is made as to whether or not a new path is a path for common channel signals, despreading processing is performed using several symbols before or behind a midamble in the data portion. Consequently, it is possible to perform despreading using the portion of good channel estimation accuracy and thereby heighten the accuracy of despread output.

(Second Embodiment)

Figure 6:
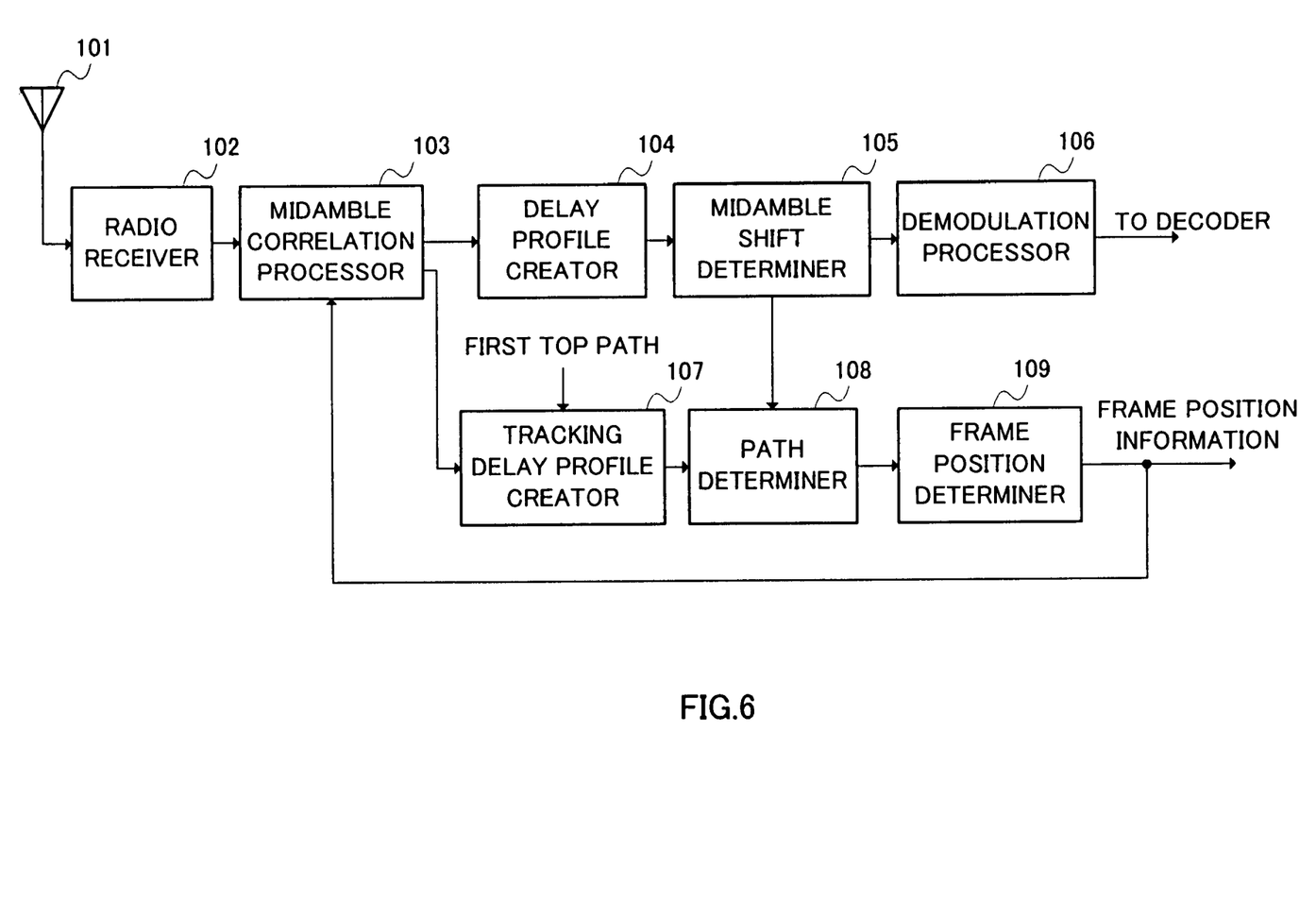
FIG. 6 is a block diagram showing a configuration of a receiving apparatus according to a second embodiment of the present invention.

FIG. 6 is a drawing showing a configuration of a receiving apparatus according to the second embodiment. The configuration of the present embodiment differs from the configuration shown in FIG. 1 in that output of midamble shift determiner 105 goes to path determiner 108 as well, and other parts identical to those in FIG. 1 are assigned the same reference numerals without further explanation.

Midamble shift determiner 105 is a user determiner, and, using a delay profile of user 8 created at delay profile creator 104, determines whether or not user 8 is communicating based on whether or not there is a peak above a predetermined threshold level. That is to say, with user 8, when a peak above a threshold level is detected, a determination is made that user 8 is communicating, and when no peak above the threshold level is detected, a determination is made that user 8 is not communicating. This determination result is output to demodulation processor 106 and path selector 108.

Based on the information regarding whether or not user 8 is communicating, when user 8 is communicating, path determiner 108 makes a determination as to whether or not new path 202 is a path for common channel signals upon tracking processing in the common channel, and, only when new path 202 is a path for common channel signals, sets new path 202 as the new top path. On the other hand, when user 8 is not communicating, new path 202 is set as the new top path without a determination as to whether or not new path 202 is a path for common channel signals.

Thus, in addition to the effects of the first embodiment, according to the receiving apparatus of the present embodiment, if user 8 is not communicating, new path 202 is set as the new top path. Consequently, it is not necessary to determine, every time new path 202 appears, whether or not new path 202 is a path for common channel signals, thereby reducing the number of times of processing, speeding up the processing of received data, and reducing power consumption.

(Third Embodiment)

Figure 7:
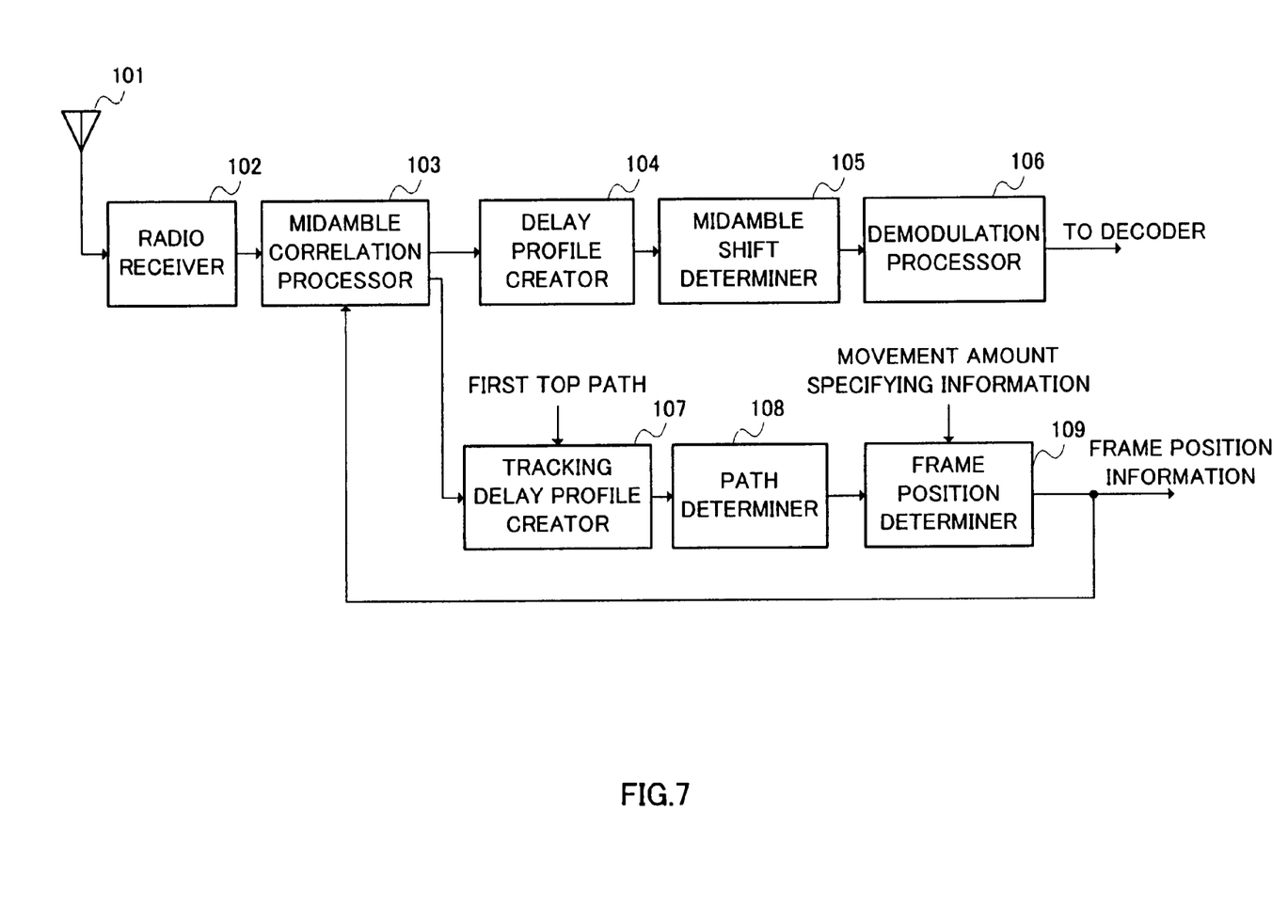
FIG. 7 is a block diagram showing a configuration of a receiving apparatus according to a third embodiment of the present invention.

FIG. 7 is a drawing showing a configuration of a receiving apparatus according to the third embodiment. The configuration of the present embodiment differs from the configuration of FIG. 1 in that movement amount specifying information that specifies the amount of samples to move is input into frame position controller 109, and other parts identical to those in FIG. 1 are assigned the same reference numerals without further explanation.

From the determination result of path determination using tracking delay profiles sampled in a prescribed sampling number, when a new path is determined to be a path for common channel signals, frame position controller 109 provisionally selects a new path ahead by a specified number of samples as the top path based on movement amount specifying information that is input. On the other hand, when a new path is determined not to be a path for common channel signals, frame position controller 109 retains the top path set earlier as is as the top path. Then, frame position controller 109 outputs information about the selected top path to midamble correlation processor 103 as frame position information, and each processing is performed at the timing based on this frame position information.

The number of samples specified by movement amount specifying information is determined taking into account both the deterioration occurring where the frontmost new path with respect to the top path is immediately selected and where this new path selected proves not to be a path for the common channel, and the deterioration occurring where the frontmost new path with respect to the top path is a path for the common channel and where this new path cannot be received before and until convergence to the frontmost new path position, that is, the right frame position.

The top path setting method and the tracking processing method will be described with reference to FIG. 8-FIG. 10. The top path setting procedures and the tracking processing procedures are the same as FIG. 4 and FIG. 5, so that explanation will be given using FIG. 4 and FIG. 5.

A case will be described with the third embodiment where a transmission signal on the common channel using midamble code 301-1 and a transmission signal of user 8 are multiplexed and transmitted.

In this case, the transmission signal on the common channel is given despreading processing using despreading code $C_1$, and the transmission signal of user 8 is given despreading processing using despreading code $C_{16}$. Incidentally, whether or not transmission signals including other midamble codes than midamble code 301-1 and midamble code 301-8 are subject to multiplexing is optional.

First, a cell search is performed between a base station apparatus and a mobile apparatus, thereby detecting the first top path (ST401).

Figure 8:
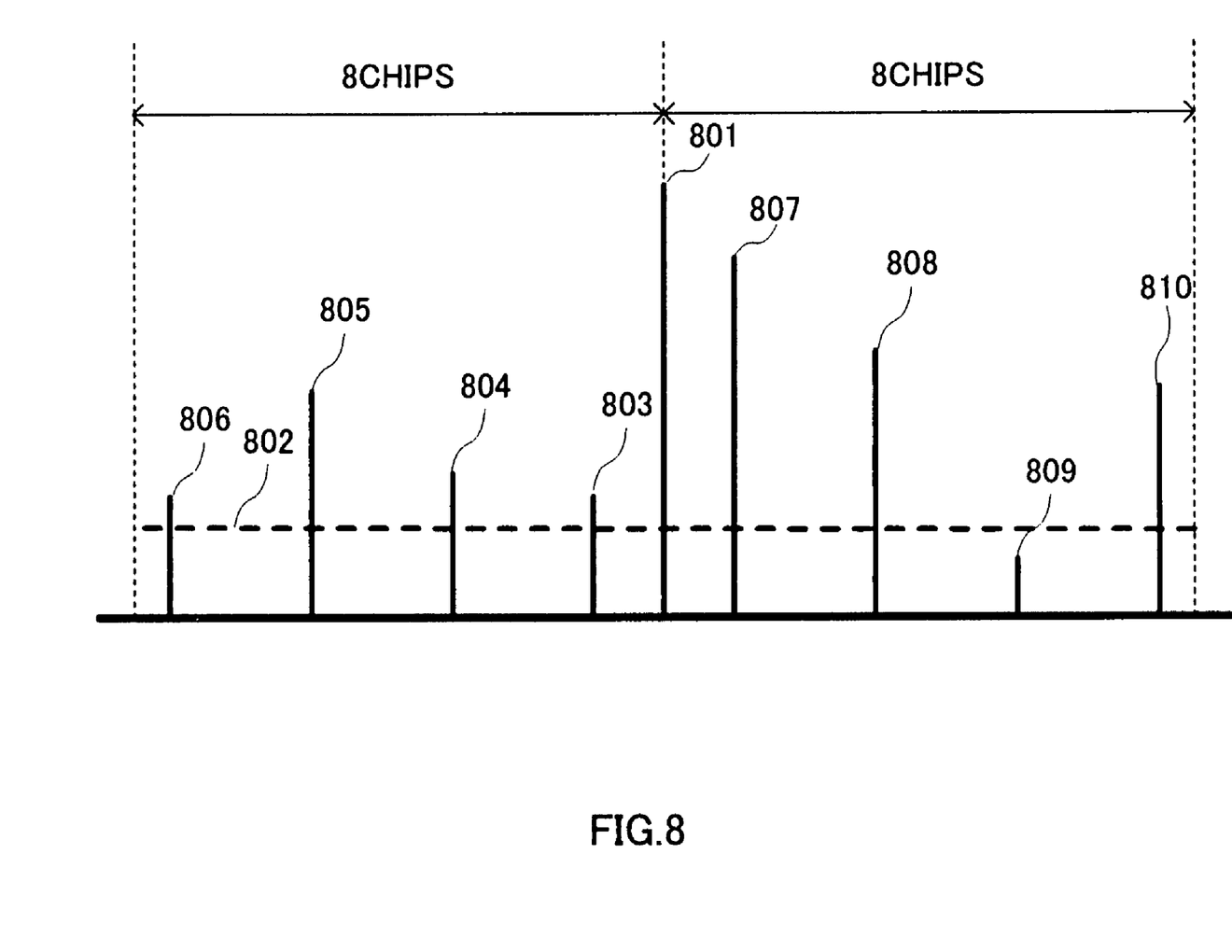
FIG. 8 is a drawing showing a delay profile according to the third embodiment of the present invention.

Next, as shown in FIG. 8, correlation windows of 8 chips open before and behind top path 801 determined by the cell search, and delay profiles are created (ST402). Incidentally, the 8 chips before the top path can be substituted with a delay profile of user 8.

Next, the delay profiles are time-averaged (ST403).

Next, referring to the averaged delay profile, peak 809 falling below threshold level 802 is not selected, whereas paths 803, 804, 805, 806, 807, 808, and 810, above threshold level 802, are selected (ST404). Each of peak 809 and the peaks selected as paths 803, 804, 805, 806, 807, 808, and 810 represents the samples sampled in a prescribed sampling number.

Referring to paths 803, 804, 805, 806, 807, 808, and 810 selected thus, a determination is made as to whether there is a path before top path 801 (ST405). Referring to FIG. 8, there are paths 803, 804, 805, and 806 before top path 801, and the frontmost path, 806, may be a direct wave on the common channel. Consequently, if path 806 is in fact a path for the common channel, setting path 806 as the top path improves reception quality. Still, a delay profile of user 8 is created just before a delay profile of common channel signals, continuously, and so at this point, it is not altogether clear whether path 806 is a path for common channel signals or a path for user 8.

Next, despreading processing is preformed with spreading code $C_{16}$, using the data portion of the received signal (ST406). Likewise, despreading processing is performed with spreading code $C_1$, using the data portion of the received signal (ST501). When the despreading processing is preformed thus using the data portion, several symbols just before or behind a midamble of good channel estimation accuracy are used. Incidentally, it is equally possible to perform the despreading processing using other data portions than the several symbols just before or behind the midamble.

Next, a comparison is drawn between output value $P_{C16}$, which is a peak power value corresponding to the despreading by despreading code $C_{16}$, and output value $P_{C1}$, which is a peak power value corresponding to the despreading by despreading code $C_1$ (ST502), and when output value $P_{C1}$ corresponding to the despreading by spreading code $P_{C1}$ is greater, path 806 is determined to be a path for common channel signals (ST503). Incidentally, the processings from ST403 to ST502 are performed at path determiner 108.

Next, when, for example, the indication of the movement amount specifying information is a move of only two samples, frame position controller 109 skips sample 803 and selects path 804, which is, from path 801, two samples closer to top path 806, as the top path (ST503).

Next, a control is performed on path 202 as to the timing of tracking processing (ST504). The top path is moved from path 201 to path 202 through tracking processing (ST505).

On the other hand, in ST405, when among the paths selected there is no path before top path 201, top path 201 is retained as is as the top path (ST506).

Moreover, in STS02, when the output value of the spreading by spreading code $C_1$ is smaller than the output value of the spreading by spreading code $C_{16}$, a path before top path 801 is determined not to be a path for common channel signals, and top path 801 is retained as is as the top path (ST506).

Figure 9:
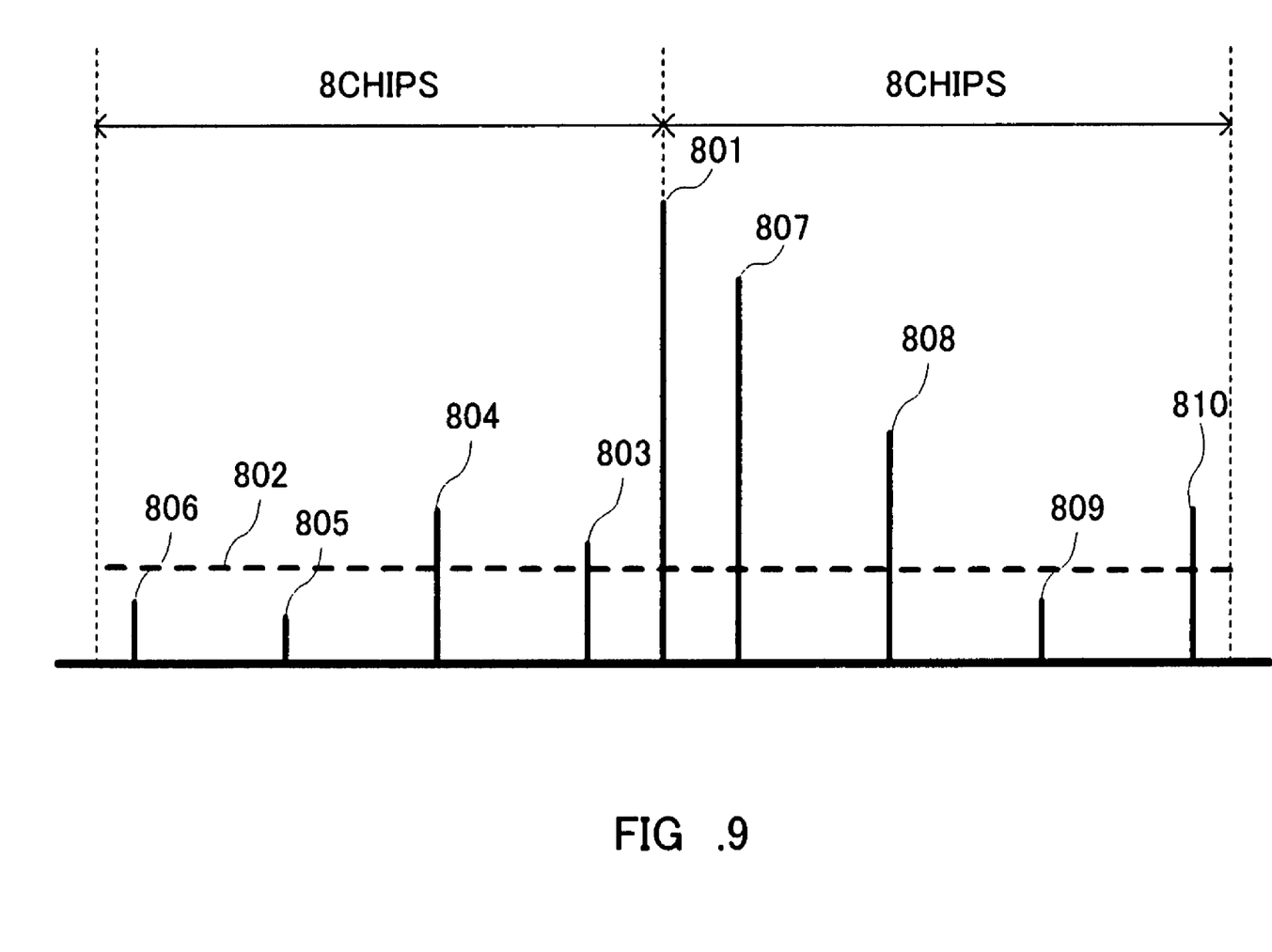
FIG. 9 is a drawing showing a delay profile according to the third embodiment of the present invention.

Then, if as a result of repeating the processings of ST402~STS06 on a per frame basis the frontmost path, 806, appearing before first selected top path 801 falls below threshold level 802, as shown in FIG. 9, frame position controller 109 sets path 804 as the top path because there is no path selected two samples ahead of path 804 that is provisionally selected as the top path. This path 806 exceeds threshold level 802 upon the first path determination in FIG. 8 due to the influence of noise and the like.

Figure 10:
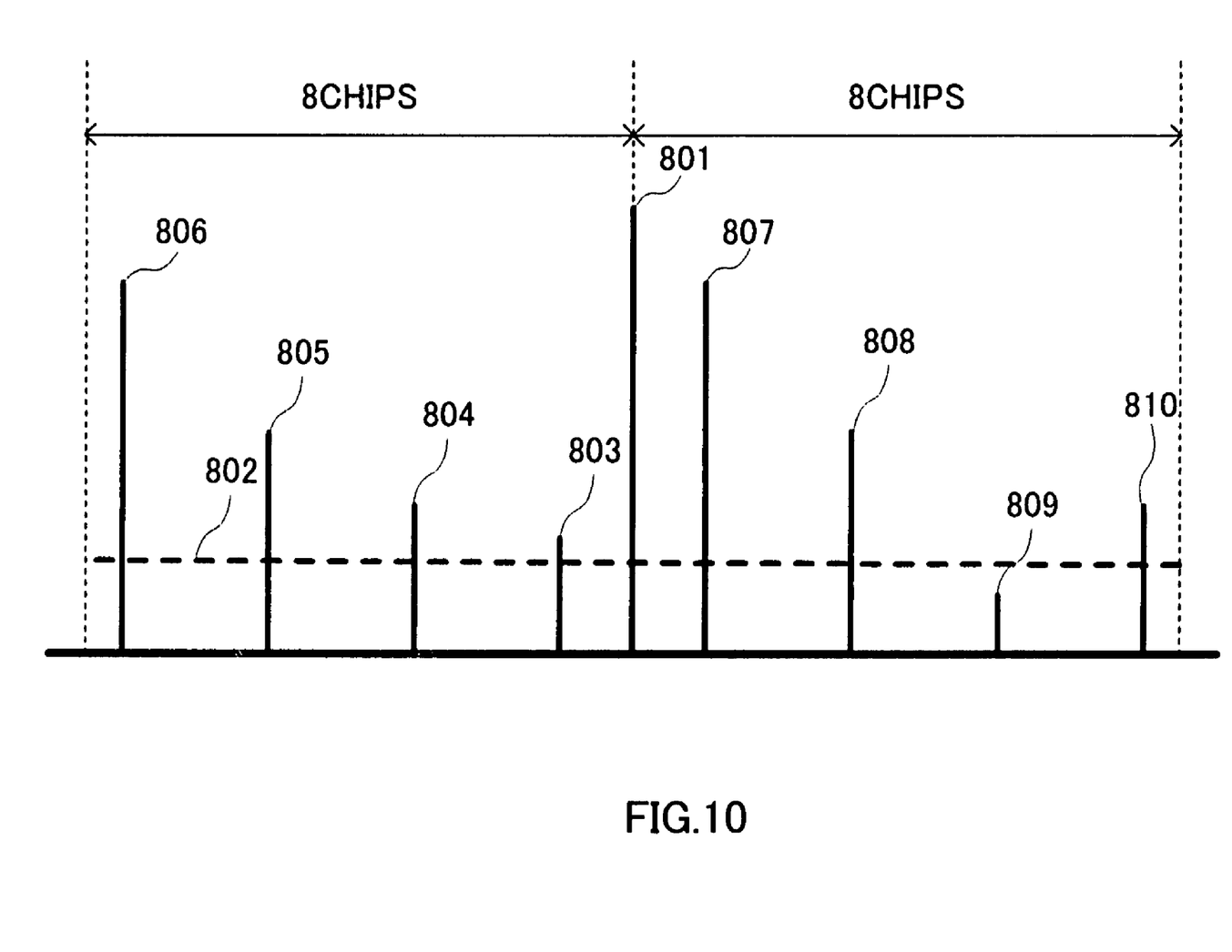
FIG. 10 is a drawing showing a delay profile according to the third embodiment of the present invention.

On the other hand, if as a result of repeating the processings of ST402~ST506 on a per frame basis the frontmost path, 806, appearing before first selected top path 801, is above threshold level 802, as shown in FIG. 10, frame position controller 109 sets path 806 as the top path because path 806 appears two samples ahead of path 804 that is provisionally selected as the top path.

Thus, the path that appears frontmost and that is above threshold level 802 is finally selected as the top path through the process of repeating the processings of ST402~ST506. Incidentally, in case 806 is a path for the common channel as shown in FIG. 10, path 806 cannot be used for demodulation when the first delay profile is created as shown in FIG. 8. However, a comparison between FIG. 8 and FIG. 10 makes it clear the power of first-detected path 806 is comparatively small. Consequently, the deterioration resulting from not using path 806 in demodulation is insignificant.

In ST405, regarding the method of determining whether or not new path 202 is a path for common channel signals, in addition to the above-described method, it is equally possible to select new path 202 as a path for common channel signals when the output value corresponding to the despreading by despreading code $C_1$ is above a prescribed threshold level. Further, it is also possible to select new path 202 as a path for common channel signals when the output value corresponding to the despreading with spreading code $C_{16}$ is smaller than a prescribed threshold level. Moreover, it is also possible to subtract output value $P_{C16}$ corresponding to the despreading with despreading code $C_{16}$ from output value $P_{C1}$ corresponding to the despreading with spreading code $C_1$, and, when the subtraction result is greater than a prescribed value, select new path 202 as a path for common channel signals. By this means, it is possible to avoid selecting a noise component, which is neither a path on the common channel nor a path for user 8, as a path for the common channel. Moreover, whether to perform the processings of ST402~ST506 in one frame or on a per frame basis is open to choice.

Thus, in addition to the effects of the first embodiment, according to the receiving apparatus of the present embodiment, when there is a new path before the first top path, instead of immediately setting the frontmost new path as the top path, the frame position is gradually adjusted in accordance with the new top path while path determination is performed a number of times. As a result, it is possible to minimize errors with the frame position even upon an erroneous top path determination and minimize the influence of the erroneous determination against the performance of demodulation.

If the new top path is the real path, the fact that this path cannot be used for demodulation before and until the frame position converges to its path position leaves a possibility of deterioration in the performance of demodulation. However, generally, the power of a path that appears anew is at first small and then gradually grows greater. Consequently, the deterioration resulting from not using this path before the convergence of the frame position is insignificant.

Although a case has been described with the third embodiment where the amount of movement upon selection of a new path before the top path by frame position controller 109 is two samples, the present embodiment is by no means limited to this, and it is equally possible to select any number of samples other than the number of samples of 2.

(Fourth Embodiment)

Figure 11:
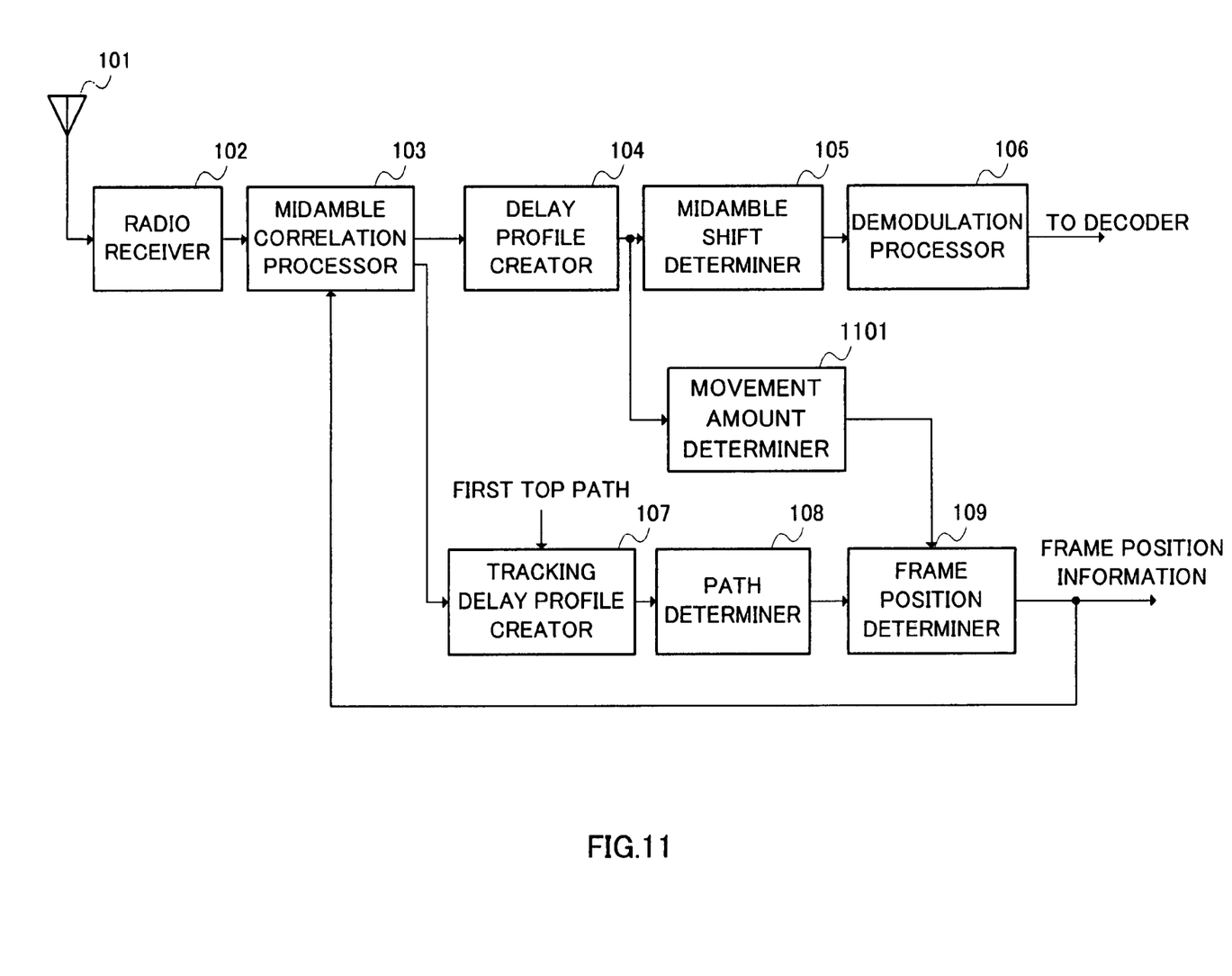
FIG. 11 is a block diagram showing a configuration of a receiving apparatus according to a fourth embodiment of the present invention.

FIG. 11 is a drawing showing a configuration of a receiving apparatus according to the fourth embodiment. The configuration of the present embodiment differs from the configuration of FIG. 1 in having movement amount determiner 1101, and parts that are identical to those in FIG. 1 are assigned the same reference numerals without further explanation.

With a delay profile input from delay profile creator 104, movement amount determiner 1101 determines the amount of changes in the path having the greatest power by way of calculation (e.g., the amount of power change per frame), and determines the number of samples to move in accordance with the amount of changes determined. For example, when the amount of power change per frame is below 3 dB, a move is made one sample forward from the top sample. When the amount of power change per frame is 3 dB~6 dB, a move is made three samples forward from the first sample. When the amount of power change per frame is 6 dB~9 dB, a move is made five samples forward from the top sample.

Movement amount determiner 1101 may have a lookup table memorized therein that associates the amounts of power change and the amounts of movement and determine the amount of samples to move by determining the amount of power change and referring to the lookup table, or it may determine the amount of samples to move through any method such as determining the amount of samples to move from the amount of power change power change using an algorithm that associates the amount of power change and the amount of movement.

For example, when the communicating party is a mobile communication terminal apparatus, the amount of power change determined by movement amount determiner 1101 indicates the moving speed of the communication terminal apparatus. Incidentally, the top path setting method and the tracking processing method are the same as those shown in FIG. 4, FIG. 5, and FIG. 8–FIG. 10 of the third embodiment, and so no more explanation of them will be given here.

Thus, in addition to the effects of the above first and third embodiment, according to the receiving apparatus of the present embodiment, when for instance the communicating party is a mobile communication terminal apparatus, it is possible to set the number of samples to move forward upon selecting a new path before the top path in accordance with the moving speed of the communication terminal apparatus. By this means, when the communication terminal apparatus moves at a high speed, it is possible to shorten the time required for convergence to the right frame position, and set the right frame position before the power of the new top path grows significantly. The number of samples to move grows as the movement speed of the communication terminal apparatus increases, because, when the communication terminal apparatus moves at a high movement speed, the power of the new path increases rapidly. Moreover, when the communication terminal apparatus moves at a low movement speed or is still, the power of the new top path grows slowly, so that it is possible to take a long time and set the right frame position without error. As a result, the deterioration resulting from not using the new path for modulation before and until convergence to the frame position and the deterioration resulting from erroneous frame position setting can be minimized.

Although a case has been described with the fourth embodiment where the number of samples to move forward with respect to the top path is variable in accordance with the movement speed of the communication terminal apparatus, the present embodiment is by no means limited to this, and it is equally possible to change the number of samples to move forward with respect to the top path based upon arbitrarily determined parameters, such as changing the number of samples to move forward with respect to the top path in accordance with distance with respect to the communication terminal apparatus.

Although cases have been described with the above-described first through fourth embodiments where tracking processing is performed by means of a common channel of a specific channel, the present invention is by no means limited to this and is equally applicable to cases where the tracking processing is performed in other channels and where other midamble codes than midamble code 301-1 are used. The above first through fourth embodiments are equally applicable to cases where other midamble codes than midamble code 301-1 are used for a common channel and user using a midamble code of a circulation amount as of just before. Although cases have been described with the first though fourth embodiments where a determination is made as to whether or not to select a new path detected upon tracking processing as the top path, the present invention is by no means limited to this and is equally applicable to cases where a determination is made as to whether a new path is selected upon rake combining. Although cases have been described with the first through fourth embodiments where a determination is made as to whether or not to make a new path present before the top path the new top path, the present invention is by no means limited to this, and it is equally possible to make a determination as to whether or not to make a path present behind the top path the new top path. Moreover, where the new path has the same value as the threshold value, whether or not making a determination as to whether it is a path for a common channel is optional. Furthermore, the above first through fourth embodiments are applicable to cases of other demodulation methods than rake demodulation and JD demodulation. Additionally, the receiving apparatus described in the first to fourth embodiments are applicable to base station apparatus and communication terminal apparatus.

As described above, according to the present invention, when a new path is present before the top path, the new path is added and selected only when it is a path for a common channel, and, as a result, reception quality is improved.

The present application is based on Japanese Patent Application No.2002-148267, filed on May 22, 2002, entire content of which is incorporated herein by reference.

INDUSTRIAL APPLICABILITY

The present invention is suitable for use with a receiving apparatus and a method of detecting the top path in delay profiles.

The invention claimed is:

1. A receiving apparatus comprising:
 a correlation operator that performs a correlation operation with a midamble included in a received signal and a midamble sequence formed by cyclically shifting a basic midamble code by a predetermined amount;
 a delay profile creator that creates a delay profile based on a result of the correlation operation;
 a path determiner that determines whether or not a new path before a top path of a specific channel in the delay profile is a path of said specific channel;
 a frame position controller that, when the path determiner determines the new path to be a path of the specific channel, sets the top path anew with said new path; and
 a demodulator that, when the frame position controller sets the new path as a new top path, demodulates the received signal in accordance with the new path.

2. The receiving apparatus according to claim 1, further comprising a user determiner that determines whether or not communication is in progress on a per user basis based on the delay profile,
 wherein the path determiner performs determination processing only when a user using the midamble of a circulation amount corresponding to just before the specific channel is communicating.

3. The receiving apparatus according to claim 1, wherein the path determiner performs despreading processing using a spreading code for the specific channel and a spreading code for a user using a midamble of a circulation amount corresponding to just before said specific channel, and, when an output value of the despreading processing of said specific channel is greater than the output value of the despreading processing of the user using said midamble of the circulation amount corresponding to just before said specific channel, determines the new path to be a path of said specific channel.

4. The receiving apparatus according to claim 1, wherein, when an output value of despreading processing with a spreading code for the specific channel is above a threshold level, the path determiner determines the new path to be a path of said specific channel.

5. The receiving apparatus according to claim 1, wherein, when an output value of despreading processing with a spreading code for a user using a midamble of a circulation amount corresponding to just before the specific channel is below a threshold level, the path determiner determines the new path to be a path for said specific channel.

6. The receiving apparatus according to claim 1, wherein the frame position controller sets the top path anew with a new path that is a predetermined number of samples ahead of the top path in the delay profile sampled.

7. A base station apparatus comprising a receiving apparatus, said receiving apparatus comprising:
 a correlation operator that performs a correlation operation with a midamble included in a received signal and a midamble sequence formed by cyclically shifting a basic midamble code by a predetermined amount;
 a delay profile creator that creates a delay profile based on a result of the correlation operation;
 a path determiner that determines whether or not a new path before a top path of a specific channel in the delay profile is a path of said specific channel;
 a frame position controller that, when the path determiner determines the new path to be a path of the specific channel, sets the top path anew with said new path; and
 a demodulator that, when the frame position controller sets the new path as a new top path, demodulates the received signal in accordance with the new path.

8. A communication terminal apparatus comprising a receiving apparatus, said receiving apparatus comprising:
 a correlation operator that performs a correlation operation with a midamble included in a received signal and a midamble sequence formed by cyclically shifting a basic midamble code by a predetermined amount;
 a delay profile creator that creates a delay profile based on a result of the correlation operation;
 a path determiner that determines whether or not a new path before a top path of a specific channel in the delay profile is a path of said specific channel;
 a frame position controller that, when the path determiner determines the new path to be a path of the specific channel, sets the top path anew with said new path; and
 a demodulator that, when the frame position controller sets the new path as a new top path, demodulates the received signal in accordance with the new path.

9. A method of detecting a top path, comprising the steps of:
 performing a correlation operation with a midamble included in a received signal and a midamble sequence formed by cyclically shifting a basic midamble code by a predetermined amount;
 creating a delay profile based on a result of the correlation operation;
 determining whether or not a new path before a top path of a specific channel in the delay profile is a path of said specific channel; and
 setting the top path anew with the new path when said new path is determined to be a path of the specific channel.

* * * * *